US012441255B2

(12) United States Patent
Krishnan et al.

(10) Patent No.: US 12,441,255 B2
(45) Date of Patent: Oct. 14, 2025

(54) SENSOR ASSEMBLY INCLUDING MOUNTING BRACKET FUSED TO VEHICLE BODY

(71) Applicant: Ford Global Technologies, LLC, Dearborn, MI (US)

(72) Inventors: Venkatesh Krishnan, Canton, MI (US); Ingo Fromel, Salvador / Bahia (BR); Carlos Arthur Franca, Lauro de Freitas/Bahia (BR); Rashaun Phinisee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 18/066,455

(22) Filed: Dec. 15, 2022

(65) Prior Publication Data

US 2024/0198924 A1 Jun. 20, 2024

(51) Int. Cl.
*B60R 11/04* (2006.01)
*B60R 11/00* (2006.01)

(52) U.S. Cl.
CPC ......... *B60R 11/04* (2013.01); *B60R 2011/004* (2013.01); *B60R 2011/0043* (2013.01); *B60R 2011/0045* (2013.01); *B60R 2011/005* (2013.01); *B60R 2011/0066* (2013.01)

(58) Field of Classification Search
CPC ............. B60R 11/04; B60R 2011/0045; B60R 2011/0043; B60R 2011/004; B60R 2011/005; B60Q 1/2611; B60Q 1/2653

USPC ........................................................ 296/210
See application file for complete search history.

(56) References Cited

U.S. PATENT DOCUMENTS

| | | | |
|---|---|---|---|
| 10,099,630 B1 * | 10/2018 | Krishnan | G01S 7/4813 |
| 10,272,850 B2 * | 4/2019 | Frank | B62D 25/06 |
| 10,302,744 B1 * | 5/2019 | Krishnan | B60R 11/04 |
| 10,514,303 B2 * | 12/2019 | Krishnan | G01S 13/931 |
| 10,800,346 B2 * | 10/2020 | Taylor | B60J 10/90 |
| 10,802,121 B1 * | 10/2020 | Krishnan | G01S 17/931 |
| 11,099,039 B2 * | 8/2021 | Krishnan | G01D 11/30 |
| 11,247,616 B2 * | 2/2022 | Boswell | B60R 11/04 |
| 11,541,940 B1 * | 1/2023 | Ng | B62D 25/025 |
| 11,571,773 B1 * | 2/2023 | Robertson, Jr. | B23P 19/10 |
| 11,603,048 B2 * | 3/2023 | Shane | B60R 11/04 |
| 11,703,570 B2 * | 7/2023 | Krishnan | G01S 7/4813 356/4.01 |
| 11,812,124 B2 * | 11/2023 | Krishnan | G07C 9/00571 |
| 12,092,761 B2 * | 9/2024 | Phinisee | B60W 60/001 |
| 12,235,390 B2 * | 2/2025 | Phinisee | G01S 7/4813 |
| 2018/0015886 A1 | 1/2018 | Frank et al. | |
| 2018/0150083 A1 | 5/2018 | Izadian | |
| 2018/0265019 A1 | 9/2018 | Dry et al. | |
| 2020/0346590 A1 | 11/2020 | Shane et al. | |
| 2022/0041139 A1 * | 2/2022 | Surineedi | B60S 1/56 |
| 2022/0075030 A1 | 3/2022 | D'Antonio et al. | |
| 2022/0099826 A1 | 3/2022 | Vervoort et al. | |

(Continued)

*Primary Examiner* — Jason S Morrow
(74) *Attorney, Agent, or Firm* — Frank A. MacKenzie; Brooks Kushman P.C.

(57) ABSTRACT

A vehicle includes a vehicle body having an exterior surface. A sensor assembly has a mounting bracket and a sensor housing. The mounting bracket is on the exterior surface of the vehicle body and is fused to the exterior surface of the vehicle body. The sensor housing is releasably connected to the mounting bracket.

20 Claims, 5 Drawing Sheets

(56) References Cited

U.S. PATENT DOCUMENTS

| | | | |
|---|---|---|---|
| 2023/0095150 A1* | 3/2023 | Phinisee | G05D 23/22 |
| | | | 374/179 |
| 2024/0201332 A1* | 6/2024 | Robertson, Jr. | G01S 13/865 |
| 2024/0270178 A1* | 8/2024 | Robertson, Jr. | B60R 11/04 |

* cited by examiner

SENSOR ASSEMBLY INCLUDING MOUNTING BRACKET FUSED TO VEHICLE BODY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
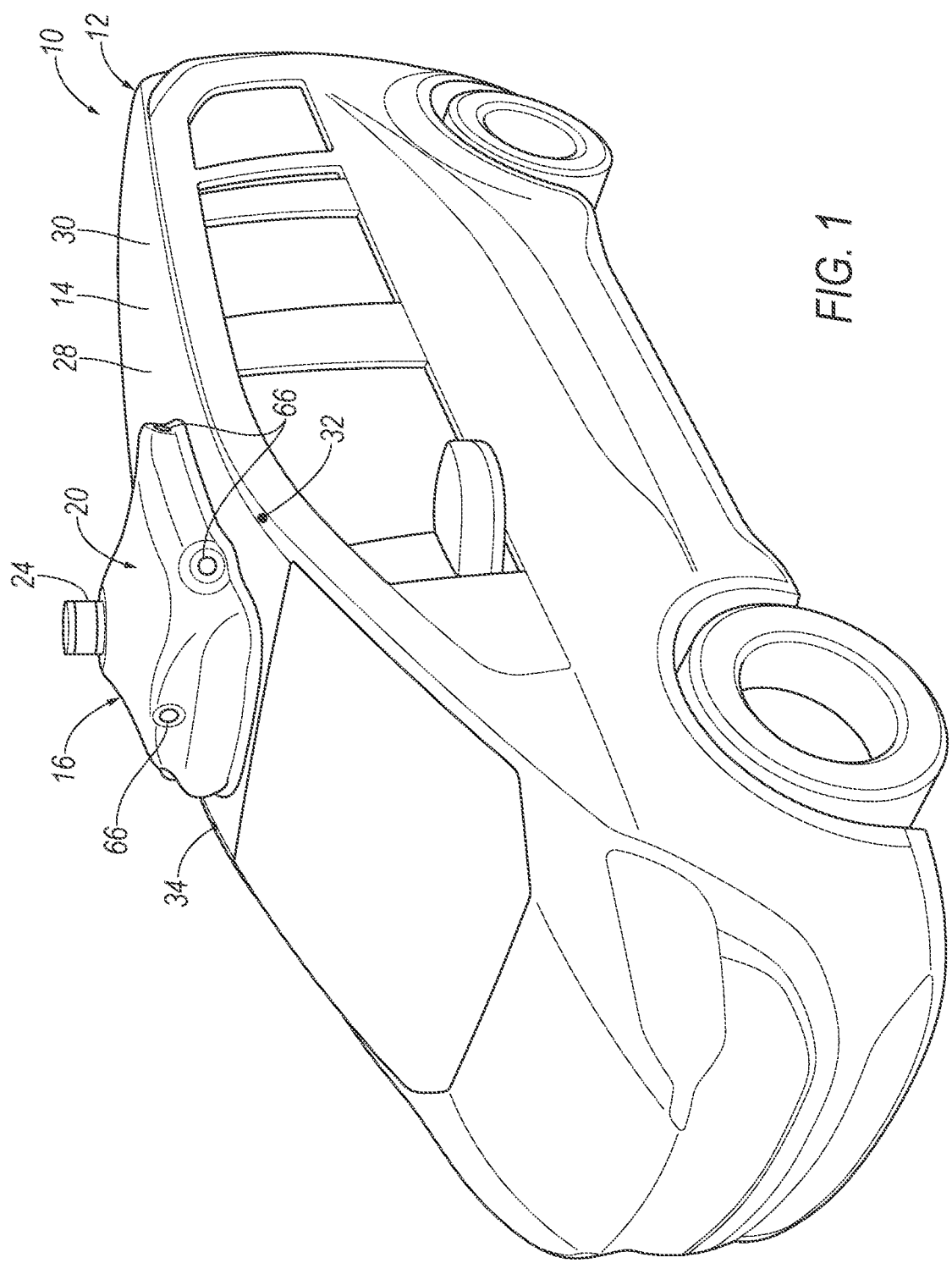
FIG. 1 is a perspective view of a vehicle with a sensor assembly.

A vehicle includes a vehicle body having an exterior surface. A sensor assembly has a mounting bracket and a sensor housing. The mounting bracket is on the exterior surface of the vehicle body and is fused to the exterior surface of the vehicle body. The sensor housing is releasably connected to the mounting bracket.

The mounting bracket may be fused to the exterior surface at a welded joint

The mounting bracket may be fused to the exterior surface at a plurality of welded joints. At least some of the welded joints may be spaced from each other cross-vehicle and vehicle-longitudinally. The vehicle includes a longitudinal centerline. The vehicle body may include a vehicle roof including the exterior surface. The vehicle roof may include a left longitudinal roof rail and a right longitudinal roof rail on opposite sides of the longitudinal centerline, a first one of the welded joints may be between the longitudinal centerline and the right longitudinal roof rail and a second one of the welded joints may be between the longitudinal centerline and the left longitudinal roof rail. The first one of the welded joints may be closer to the right longitudinal roof rail than the vehicle centerline. The second one of the welded joints may be closer to the left longitudinal roof rail than the vehicle centerline. The vehicle body defines a hole. The mounting bracket extends endlessly around the hole. The welded joints are between the hole and an outer periphery of the mounting bracket. A seal may be fixed to the mounting bracket and the exterior surface of the vehicle body. The seal may extend from the mounting bracket to the exterior surface of the vehicle body. The seal may extend endlessly around all of the plurality of welded joints.

The vehicle body may define a hole. The mounting bracket may extend endlessly around the hole. A seal may be fixed to the mounting bracket and the exterior surface of the vehicle body. The seal may extend from the mounting bracket to the exterior surface of the vehicle body. The seal may extend endlessly around the hole. A second seal may be between the vehicle body and the sensor housing. The second seal may extend endlessly around the seal.

A seal may be between the mounting bracket and the exterior surface of the vehicle body. The mounting bracket includes a bottom surface. The bottom surface abuts the exterior surface of the vehicle body and an upturned flange extends upwardly from the bottom surface away from the exterior surface at an outer periphery of the bottom surface. The seal may be fixed to the upturned flange and the exterior surface of the vehicle body and extend from the upturned flange to the exterior surface of the vehicle body. The vehicle body defines a hole. The mounting bracket extends endlessly around the hole. The seal may extend endlessly around the hole.

The sensor assembly may include an object-detection sensor.

The sensor assembly may include an image sensor.

The vehicle includes a passenger compartment. The vehicle body may include a vehicle roof having the exterior surface. An interior surface is opposite of the exterior surface. The interior surface faces the passenger compartment.

The vehicle body includes a vehicle roof including the exterior surface. The mounting bracket structurally reinforces the vehicle roof. The sensor housing has a base and a cap. The base is releasably connected directly to the mounting bracket. The cap is releasably connected directly to the base.

A sensor assembly comprising a mounting bracket has a bottom surface and an upturned flange extending upwardly from the bottom surface at an outer periphery of the bottom surface. The upturned flange defines a seal channel. The mounting bracket includes a plurality of threaded holes. A sensor housing has a plurality of through-holes positioned to be aligned with the threaded holes. The sensor housing has a bottom lip positioned to extend endlessly around the mounting bracket when the through-holes are aligned with the threaded holes. A seal is fixed to the bottom lip extending along the bottom lip endlessly around the mounting bracket.

With reference to the Figures, wherein like numerals indicate like parts throughout the several views, a vehicle 10 includes a vehicle body 12 having an exterior surface 14. A sensor assembly 16 has a mounting bracket 18 and a sensor housing 20. The mounting bracket 18 is on the exterior surface 14 of the vehicle body 12 and is fused to the exterior surface 14 of the vehicle body 12. The sensor housing 20 is releasably connected to the mounting bracket 18.

The mounting bracket 18 being fused to the exterior surface 14 of the vehicle body 12 structurally reinforces the vehicle body 12. For example, in the example shown in the Figures, the mounting bracket 18 is fused to the exterior surface 14 of a vehicle roof 22 and the mounting bracket 18 structurally reinforces the vehicle roof 22. The fusing of the mounting bracket 18 to the vehicle body 12 also allows for repeatable and accurate assembly of the sensor assembly 16 to the vehicle roof 22 for proper location of object-detection sensors 24 of the sensor assembly 16 within location tolerances of the object-detection sensors 24.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 may be an autonomous vehicle. A computer (not shown) can be programmed to operate the vehicle 10 independently of the intervention of a human driver, completely or to a lesser degree. The computer may be programmed to operate the propulsion, brake system, steering, and/or other vehicle systems based at least in part on data received from the sensor unit. For the purposes of this disclosure, autonomous operation means the computer controls the propulsion device, brake system, and steering system without input from a human driver; semi-autonomous operation means the computer controls one or two of the propulsion system, brake system, and steering system and a human driver controls the remainder; and nonautonomous operation means a human driver controls the propulsion system, brake system, and steering system.

With reference to FIG. 1, the vehicle 10 defines a vehicle-longitudinal centerline L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through the floor and the vehicle roof 22. The vehicle-longitudinal centerline L, the cross-vehicle axis, and the vertical axis are perpendicular relative to each other.

The vehicle 10 includes the vehicle body 12 and a vehicle frame. The vehicle body 12 and the vehicle frame may be of a unibody construction in which the vehicle frame is unitary with a vehicle body 12 (including frame rails, pillars, roof rails 32, 34, etc.). As another example, the vehicle body 12 and vehicle frame may have a body-on-frame construction (also referred to as a cab-on-frame construction) in which the vehicle body 12 and frame are separate components, i.e., are modular, and the vehicle body 12 is supported on and affixed to the frame. Alternatively, the vehicle frame and vehicle body 12 may have any suitable construction. The vehicle frame and vehicle body 12 may be of any suitable material, for example, steel, aluminum, and/or fiber-reinforced plastic, etc.

The vehicle body 12 may define a passenger compartment to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

The vehicle body 12 includes body panels 28 partially defining an exterior of the vehicle 10. The body panels 28 may present a class-A surface, e.g., a finished surface exposed to view by a customer and free of unaesthetic blemishes and defects. The body panels 28 include, e.g., a roof panel 30, hood, a decklid, fenders, etc. The body panels 28 have class-A surfaces, i.e., a surface specifically manufactured to have a high-quality, finished aesthetic appearance free of blemishes, etc.

With reference to FIG. 1, the vehicle body 12 includes the vehicle roof 22. The vehicle roof 22 provides cover for occupants for the vehicle 10. The vehicle roof 22 may include a roof panel 30. In the example shown in the Figures, the sensor assembly 16 is on the roof.

The vehicle roof 22 may include cross-members and roof rails 32, 34, i.e., a left longitudinal roof rail 32 and a right longitudinal roof rail 34. The cross-members and roof rails 32, 34 support the roof panel 30. The cross-members, the roof rails 32, 34, and the roof panel 30 may be metal (steel, aluminum, etc.), polymeric (e.g., fiber-reinforced plastic), or other suitable material. The roof rails 32, 34 are spaced from one another in a cross-vehicle direction. The roof rails 32, 34 each extend longitudinally along the vehicle body 12, i.e., along a vehicle-longitudinal axis L. The left longitudinal roof rail 32 and the right longitudinal roof rail 34 on opposite sides of the longitudinal centerline L and may be equidistantly spaced from the vehicle-longitudinal centerline L. The front cross-member and the rear cross-member may be elongated cross-vehicle from the left longitudinal roof rail 32 to the right longitudinal roof rail 34. The roof panel 30 provide class-A surfaces to the vehicle roof 22, i.e., surfaces specifically manufactured to have a high-quality, finished aesthetic appearance free of blemishes, etc.

The vehicle 10 may include a headliner 36 supported by the vehicle roof 22, e.g., the cross-members, the roof rails 32, 34, and/or the roof panel 30. The headliner 36 is above the passenger cabin, e.g., may define the interior surface 40 of the passenger cabin. The headliner 36 may be attached to the cross-members and/or the roof rails 32, 34. The headliner 36 may be a felt covering a plastic shell or any suitable material. The headliner 36 provides class-A surfaces to the vehicle roof 22, i.e., surfaces specifically manufactured to have a high-quality, finished aesthetic appearance free of blemishes, etc.

The vehicle body 12, e.g., one or more of the body panels 28, has the exterior surface 14 and has an interior surface 40 opposite the exterior surface 14. For example, the vehicle roof 22 has the exterior surface 14 and the interior surface 40 opposite the exterior surface 14. In the example shown in the Figures, the interior surface 40 of the vehicle roof 22 faces the passenger compartment of the vehicle 10 and the exterior surface 14 of the vehicle roof 22 is exterior of the vehicle 10.

The vehicle body 12 defines a hole 42. The sensor assembly 16 is on the vehicle body 12 at the hole 42 and the hole 42 provides access through the vehicle body 12 from the sensor assembly 16, e.g., for wires, cables, maintenance access, etc. As example, in the example shown in the Figures, the vehicle roof 22 defines the hole 42. The hole 42 extends through the body panel 28 of the vehicle body 12, e.g., through the roof panel 30 of the vehicle roof 22. Specifically, the body panel 28, e.g., the roof panel 30, includes an inner lip 44 extending about the hole 42 and the inner lip 44 may define at least a portion of the hole 42. In the example shown in the Figures, the hole 42 extends from the interior surface 40 of the vehicle roof 22 to the exterior surface 14 of the vehicle roof 22.

Figure 2:
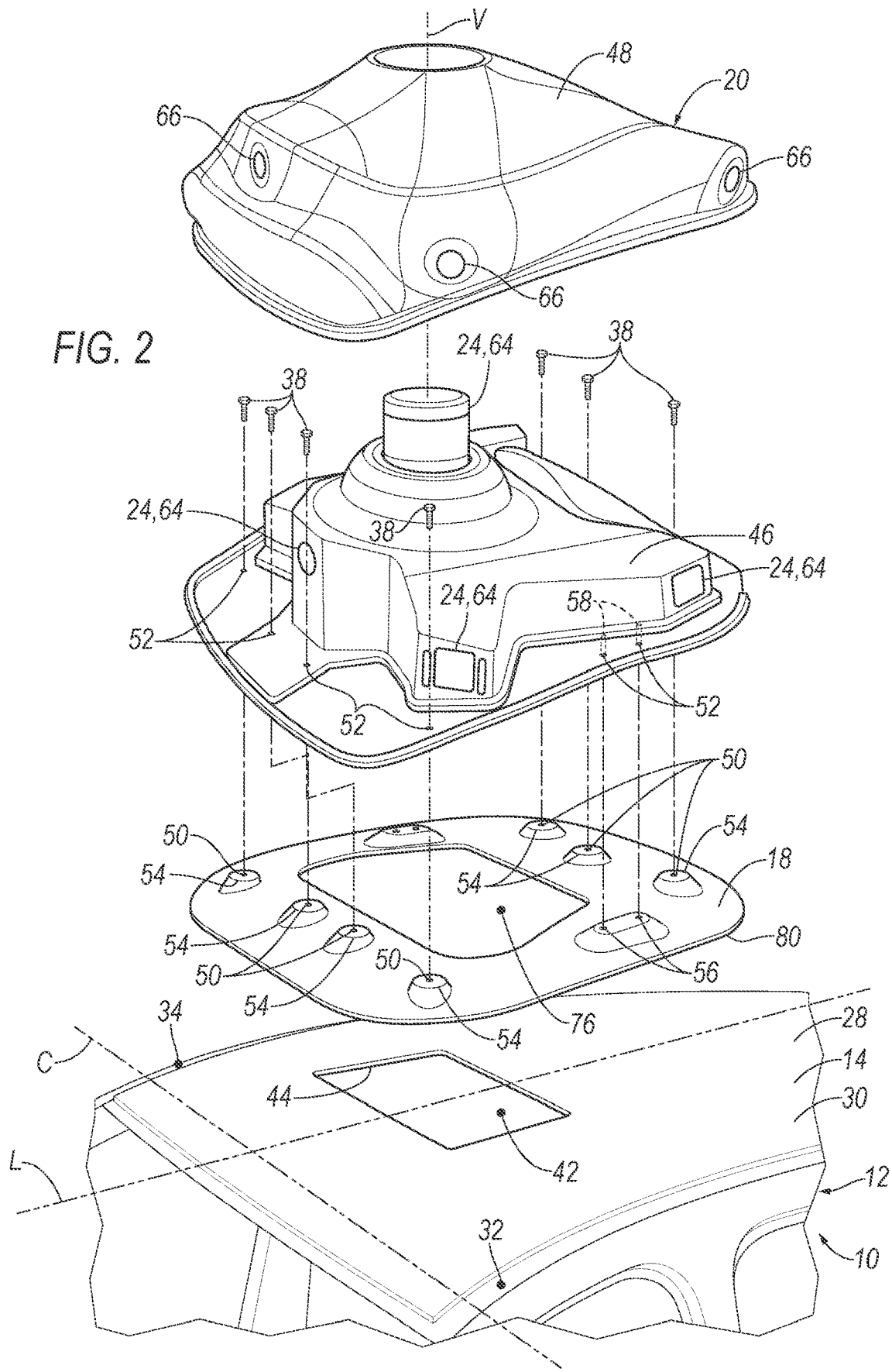
FIG. 2 is an exploded perspective view of the sensor assembly exploded from a roof of the vehicle.

With reference to FIG. 2, the sensor assembly 16 includes the mounting bracket 18 and the sensor housing 20. The mounting bracket 18 is permanently fixed to the vehicle body 12, e.g., the vehicle roof 22, and the sensor housing 20 is releasably connected to the mounting bracket 18 to connect and disconnect the sensor housing 20 with the vehicle body 12, e.g., the vehicle roof 22. The sensor housing 20 may have, as an example, a base 46 and a cap 48. The base 46 is releasably connected to the mounting bracket 18 and the cap 48 is releasably connected to the base 46, as described further below. The base 46 and/or the cap 48 may house object-detection sensors 24. Specifically, in the example shown in the Figures, the base 46 houses the object-detection sensors 24.

In the example shown in FIG. 2, the sensor housing 20 includes the base 46. The base 46 may house the object-detection sensors 24, as described above, and may support and house electronics, sensor cleaning equipment, sensor cooling equipment, etc. The base 46 may be, for example, plastic, metal, etc.

The sensor housing 20, and specifically the base 46 of the sensor housing 20 in the example in FIG. 2, is connected to the mounting bracket 18. When connected to the mounting bracket 18, the mounting bracket 18 fixes the sensor housing 20 to the vehicle body 12, e.g., to the vehicle roof 22 in the example shown in the Figures. In other words, the sensor housing 20 moves as a unit with the vehicle roof 22 when the sensor housing 20 is connected to the mounting bracket 18.

The sensor housing 20 is releasably connected to the mounting bracket 18. Specifically, the base 46 of the sensor housing 20 is releasably connected to the mounting bracket 18. Specifically, the base 46 may be removed from the mounting bracket 18 without destruction of the base 46 or the mounting bracket 18. As an example, the base 46 may be releasably connected to the mounting bracket 18 with threaded fasteners 38, as described below. As other examples, the base 46 may be releasably connected to the mounting bracket 18 with clips, latches, magnetic connections, etc., that allow for the removal of the base 46 from the mounting bracket 18. As an example, the base 46 may be released from the mounting bracket 18 by a service technician for repair or replacement of the base 46.

Figure 4:
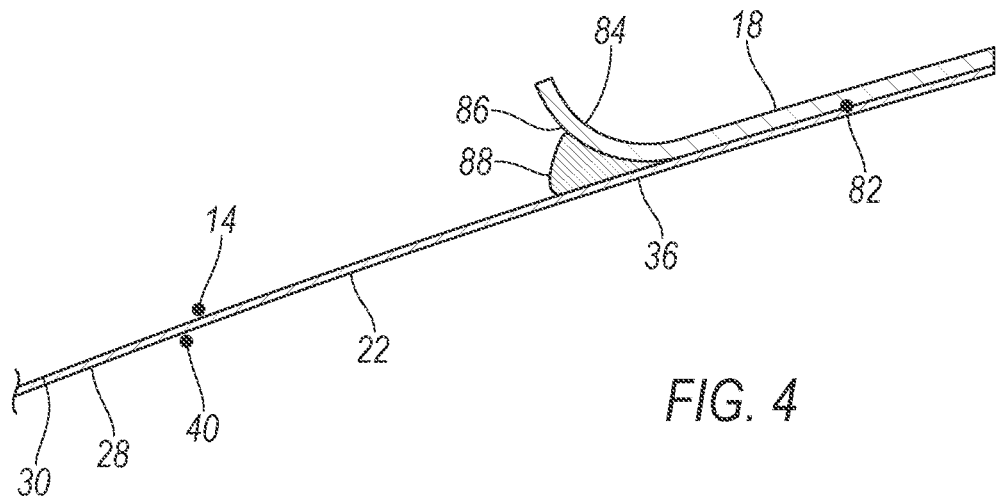
FIG. 4 is a cross-sectional view through line 4 of FIG. 3.

The sensor housing 20, and specifically the base 46 of the sensor housing 20, is releasably connected directly to the mounting bracket 18. Specifically, the base 46 of the sensor housing 20 abuts the mounting bracket 18 when the base 46 is connected to the mounting bracket 18, as shown in FIG. 4. In the example shown in FIGS. 2 and 4, at least a portion of the base 46 of the sensor housing 20 and the mounting bracket 18 are shaped to fit together such that at least a portion of the base 46 of the housing abuts the mounting bracket 18.

Figure 6:
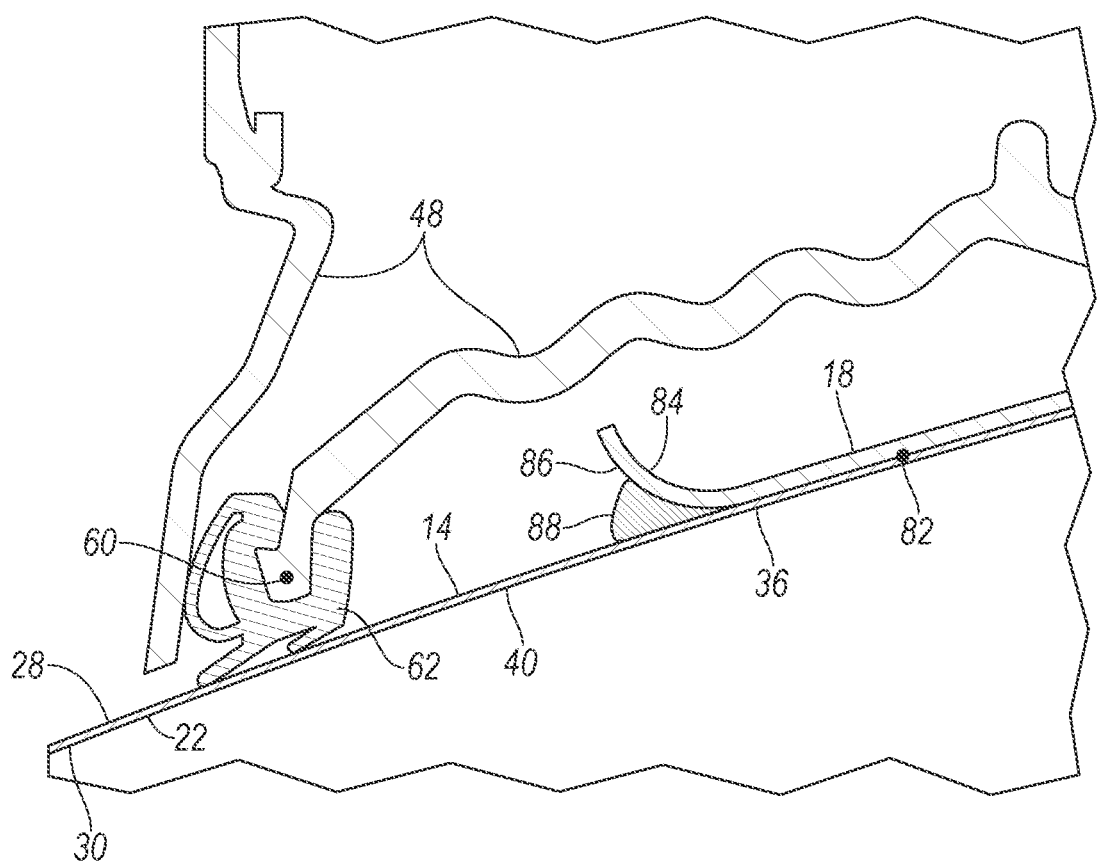
FIG. 6 is a cross-sectional view through line 6 of FIG. 1.

In the example shown in FIGS. 2 and 6, the mounting bracket 18 includes a plurality of threaded holes 50 and the sensor housing 20 includes a plurality of through-holes 52 positioned to be aligned with the threaded holes 50 for attachment of the sensor housing 20 to the mounting bracket 18. Specifically, the base 46 of the sensor housing 20 includes the plurality of through-holes 52. The sensor housing 20 includes threaded fasteners 38, e.g., bolts, that extend through the through-holes 52 and threadedly engage the threaded holes 50, as shown in FIG. 4, to releasably connect the sensor housing 20, specifically the base 46, to the mounting bracket 18.

Figure 3:
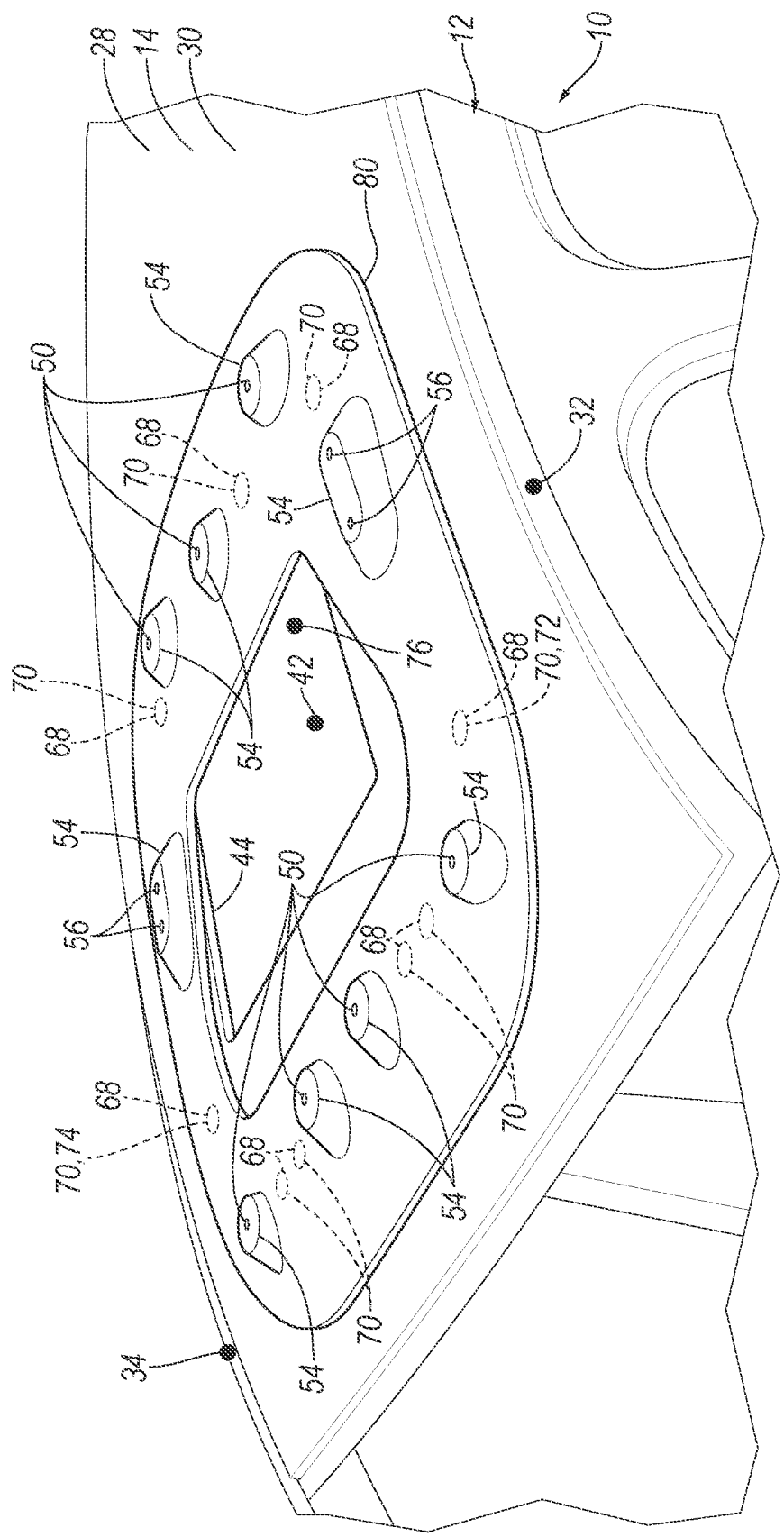
FIG. 3 is another exploded perspective view with a mounting bracket of the sensor assembly fused to the roof of the vehicle.
Figure 5:
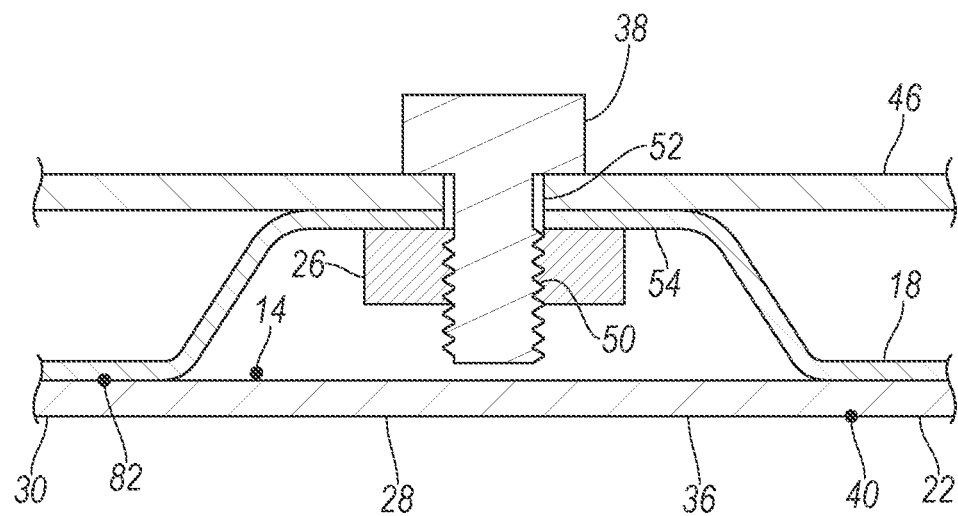
FIG. 5 is the cross-sectional view through line 5 of FIG. 3.

The mounting bracket 18 may include platforms 54 that present the threaded holes 50, as shown in FIGS. 2, 3, and 5. The platforms 54 may be spaced from the exterior surface 14 of the vehicle roof 22, as shown in FIG. 5. The mounting bracket 18 may, for example, include weld nuts 26 (shown in FIG. 5) fixed to the platforms 54 and, in such examples, the weld nuts 26 include the threaded holes 50. At least one of the platforms 54 may include locator holes 56 and, in such an example, the sensor housing 20, e.g., the base 46, includes locator pins 58 received in the locator holes 56 when the base 46 is connected to the mounting bracket 18.

In the example shown in FIG. 2, the sensor housing 20 includes the cap 48. The cap 48 covers the base 46 and may be supported on the mounting bracket 18 by the base 46. In the example shown in the Figures, the cap 48 includes lenses 66 aligned with the fields of view of the object detection sensors. The housing may be for example, plastic, metal, etc.

The cap 48 is connected to the base 46. Specifically, the cap 48 is releasably connected to the base 46. Specifically, the cap 48 may be removed from the base 46 without destruction of the cap 48 or the base 46. As an example, the cap 48 may be releasably connected to the base 46 e.g., by clips, latches, magnetic connections, etc., that allows for removal of the cap 48 from the base 46. As an example, the cap 48 may be released from the base 46 by a service technician.

The cap 48 may be releasably connected directly to the base 46. Specifically, the cap 48 of the sensor housing 20 abuts the base 46 of the sensor housing 20 when connected to the base 46, as shown in FIG. 4. In the example shown in FIGS. 2 and 4, at least a portion of the base 46 of the sensor housing 20 and the cap 48 of the sensor housing 20 are shaped to fit together such that at least a portion of the cap 48 of the housing abuts the base 46.

The sensor housing 20 has a bottom lip 60 positioned to extend endlessly around the mounting bracket 18 and the hole 42 when the bolt holes are aligned with the threaded holes 50 and the sensor housing 20 is connected to the mounting bracket 18. The sensor housing 20 includes a seal 62. The seal 62 may be fixed to the bottom lip 60. The seal 62 extends along the bottom lip 60 endlessly around the mounting bracket 18. The seal 62 is carried on either the bottom lip 60 or the vehicle roof 22. In the example shown in the Figures, the seal 62 is carried on the bottom lip 60, i.e., is secured to the bottom lip 60 and moves with the bottom lip 60 when the sensor housing 20 is removed from the mounting bracket 18.

As set forth above, the seal 62 may be fixed to the bottom lip 60. The seal 62 may be held in place on the bottom lip 60 by application of an adhesive and/or by placement of the seal 62 in a channel, gutter or aperture of the bottom lip 60. The seal 62 is removable and may be replaced by a service technician.

The seal 62 is between the bottom lip 60 and the vehicle roof 22 and abuts the bottom lip 60 and the vehicle roof 22 when the sensor housing 20 is connected to the mounting bracket 18. The seal 62 seals between the bottom lip 60 and the vehicle roof 22 to prevent the passage of water, moisture, or wind when the sensor housing 20 is connected to the mounting bracket 18. Specifically, since the seal 62 extends endlessly around the mounting bracket 18 and the hole 42 and seals between the bottom lip 60 and the vehicle roof 22, the seal 62 prevents the passage of water, moisture, or wind from exterior of the sensor housing 20 to the mounting bracket 18 or the hole 42. When the sensor housing 20 is connected to the mounting bracket 18, the seal 62 may be compressed between the bottom lip 60 and the mounting bracket 18. The seal 62, for example, may be rubber. As examples, the seal 62 may be Ethylene Propylene Diene Monomer rubber (EPDM), a thermoplastic elastomer (TPE), a thermoplastic olefin (TPO) polymer/filler blend, and/or some other types of flexible materials. The seal 62 may be molded, extruded as an endless piece, etc., prior to installation to the bottom lip 60.

As set forth above, the sensor assembly 16 includes object-detection sensors 24. The object-detection sensors 24 detect objects surrounding the vehicle 10 for use in autonomous or semi-autonomous operation of the vehicle 10, as described above. The object-detection sensors 24 may be a variety of devices, including for example such as are currently known, to provide data to the vehicle computer. For example, the object-detection sensors 24 may be Light Detection And Ranging (LIDAR), vehicle sensor(s), etc., disposed on the base 46 of the sensor assembly 16, behind the lens 66 of the cap 48, around the around the sensor housing 20, etc., that provide relative locations, sizes, and shapes of objects surrounding the vehicle 10. As another example, one or more radar sensors fixed to vehicle 10 bumpers may provide data to provide locations of the objects, second vehicles, etc., relative to the location of the vehicle 10. The object-detection sensors 24 may alternatively or additionally, for example, include image sensors 64, e.g.; front view, side view, etc., capturing images from an area surrounding the vehicle 10. In the context of this disclosure, an object is a physical, i.e., material, item that can be represented by physical phenomena (e.g., light or other electromagnetic waves, or sound, etc.) detectable by object-detection sensors 24. Thus, vehicles, as well as other items including as discussed below, fall within the definition of "object" herein.

The mounting bracket 18 is on the exterior surface 14 of the vehicle body 12. In the example shown in the Figures, the mounting bracket 18 is on the exterior surface 14 of the vehicle roof 22. The mounting bracket 18 is supported on the exterior surface 14 of the vehicle body 12, e.g., the vehicle roof 22 in the example shown in the Figures. In other words, the weight of the mounting bracket 18 is borne by the exterior surface 14. The mounting bracket 18 is fused to the exterior surface 14, as described further below. The sensor housing 20 is releasably connected to the mounting bracket 18, as set forth above. When the sensor housing 20 is connected to the mounting bracket 18, the mounting bracket 18 is between the sensor housing 20 and the vehicle roof 22 and fixes the sensor housing 20 relative to the vehicle roof 22.

With reference to FIG. 3, the mounting bracket 18 is fused to the exterior surface 14 of the vehicle roof 22. In other words, material of the mounting bracket 18 and the exterior surface 14 are melted together with intermixing of the material of the mounting bracket 18 and the vehicle roof 22. As an example, the mounting bracket 18 may be fused to the exterior surface 14 by welding, as described below, in which the material of the mounting bracket 18 and the vehicle roof 22 intermix when melted during the welding process. As another example, the mounting bracket 18 may be fused to the exterior surface 14 by bonding that intermixes the material of the mounting bracket 18 and the vehicle roof 22 through chemical reaction resulting from application of a bonding material between the mounting bracket 18 and the vehicle roof 22.

Since the mounting bracket 18 is fused to the exterior surface 14 of the vehicle roof 22, the mounting bracket 18 is irremovable from the vehicle roof 22 absent destruction of the mounting bracket 18 and the vehicle roof 22, e.g., through cutting, grinding, etc. "Fused" is a structural description of the material of the mounting bracket 18 and the exterior surface 14, not the process by which the mounting bracket 18 is connected to the exterior surface 14. When fused, the mounting bracket 18 is fixed to the exterior surface 14 at a fused joint 68 without necessity of fasteners, adhesives, etc., holding the mounting bracket 18 to the exterior surface 14.

In the example shown in the Figures, the mounting bracket 18 is fused to the exterior surface 14 at a welded joint 70, as shown in FIG. 3. Specifically, the mounting bracket 18 is fused to the exterior surface 14 at a plurality of welded joints 70. "Welded" is a structural description of the material of the mounting bracket 18 and the exterior surface 14, not the process by which the mounting bracket 18 is connected to the exterior surface 14. When welded, the mounting bracket 18 is fixed to the exterior surface 14 at the welded joints 70 without necessity of fasteners, adhesives, etc., holding the mounting bracket 18 to the exterior surface 14.

At least some of the welded joints 70 are spaced from each other cross-vehicle and vehicle-longitudinally. For example, a first one of the welded joints 70, 72 is between the vehicle-longitudinal centerline L and the right longitudinal roof rail 34 and a second one of the welded joints 70, 74 being between the vehicle-longitudinal centerline L and the left longitudinal roof rail 32. The first one of the welded joints 70, 72 may be closer to the right longitudinal roof rail 34 than the vehicle-longitudinal centerline L; and the second one of the welded joints 70, 74 may be closer to the left longitudinal roof rail 32 than the vehicle-longitudinal centerline L. The welded joints 70 are between the hole 42 and an outer periphery 80 of the mounting bracket 18.

The mounting bracket 18 structurally reinforces the vehicle roof 22. For example, in the example in which the mounting bracket 18 is welded to the vehicle roof 22, the plurality of welded joints 70 between the mounting bracket 18 and the vehicle roof 22 transfers forces between the mounting bracket 18 and the vehicle roof 22. As set forth above, the welded joints 70 are spaced from each other cross-vehicle and along the vehicle-longitudinal axis to distribute anchoring and rigidity between the vehicle roof 22 and the mounting bracket 18. The mounting bracket 18, for example, increases the torsional rigidity of the vehicle roof 22 and/or dampens vibration of the vehicle roof 22 during driving of the vehicle 10.

The mounting bracket 18 extends endlessly around the hole 42 of the vehicle roof 22. In the example shown in FIGS. 2 and 3, the mounting bracket 18 includes an opening 76 aligned with the hole 42 of the vehicle roof 22 and, more specifically, the periphery of the opening 76 extends endlessly around the periphery of the hole 42 when the mounting bracket 18 is fused to the exterior surface 14. The periphery of the opening 76 is endless, i.e., the mounting bracket 18 encloses the opening 76. The welded joints 70 and the threaded holes 50 are between the periphery of the opening 76 and the outer periphery 80 of the mounting bracket 18.

The mounting bracket 18 includes a bottom surface 82 abutting the exterior surface 14 of the vehicle roof 22. Specifically, the bottom surface 82 of the mounting bracket 18 is fused to the exterior surface 14 of the vehicle roof 22, e.g., welded to the exterior surface 14 of the vehicle roof 22.

In the example shown in the Figures, the mounting bracket 18 includes an upturned flange 84 extending upwardly from the bottom surface 82 away from the exterior surface 14 at the outer periphery 80 of the bottom surface 82, as best shown in FIG. 3. The upturned flange 84 defines a seal channel 86, as described further below.

A seal 88 is fixed to the mounting bracket 18 and the exterior surface 14 of the vehicle roof 22. The seal 88 extends endlessly around all of the fused joints 68, e.g., the welded joints 70 in the example in the Figures. The seal 88 extends endlessly around the hole 42 and the opening 76 to prevent the passage of water, moisture, or wind when the sensor housing 20 is connected to the mounting bracket 18. Specifically, since the seal 88 extends endlessly around the fused joints 68, e.g., the welded joints 70, the opening 76, and the hole 42, and seals between the mounting bracket 18 and the vehicle roof 22, the seal 88 prevents the passage of water, moisture, or wind from exterior of the sensor housing 20 to the fused joints 68, the opening 76, and the hole 42.

As set forth above, in the example shown in the Figures, the mounting bracket 18 includes the upturned flange 84. In such an example, the seal 88 is fixed to the vehicle roof 22 and to the upturned flange 84. The seal 88 extends along the upturned flange 84 endlessly around the mounting bracket 18.

When the sensor assembly 16 is mounted to the vehicle roof 22, the seal 62 on the bottom lip 60 of the cap 48 creates a water-tight seal 62 between the sensor assembly 16 and the vehicle roof 22 and the seal 88 between the mounting bracket 18 and the vehicle roof 22 creates another water-tight seal 88 between the sensor assembly 16 and the vehicle roof 22. The seal 62 on the bottom lip 60 and the seal 88 at the mounting bracket 18 both prevent the passage of water, moisture, or wind when the sensor assembly 16 is connected to the vehicle roof 22. Specifically, the seal 62 on the bottom lip 60 is a first line of defense against water intrusion between the sensor assembly 16 and the vehicle roof 22. The seal 62 on the bottom lip 60 extends endlessly around the seat at the mounting bracket 18. The seal 88 on the mounting bracket 18 is a second line of defense in the event that water enters between the sensor assembly 16 and the vehicle roof 22 at the seal 62 on the cap 48.

The disclosure has been described in an illustrative manner, and it is to be understood that the terminology which has been used is intended to be in the nature of words of description rather than of limitation. The numerical adjectives "first," "second," etc. are used herein merely as identifiers and do not indicate order or importance. Many modifications and variations of the present disclosure are possible in light of the above teachings, and the disclosure may be practiced otherwise than as specifically described.

What is claimed is:

1. A vehicle comprising:
a vehicle body having an exterior surface;
a sensor assembly having a mounting bracket and a sensor housing;
the mounting bracket being on the exterior surface of the vehicle body and fused to the exterior surface of the vehicle body;
the sensor housing being releasably connected to the mounting bracket;
the vehicle body defining a hole and the mounting bracket extending endlessly around the hole; and
a seal fixed to the mounting bracket and the exterior surface of the vehicle body and extending from the mounting bracket to the exterior surface of the vehicle body, the seal extending endlessly around the hole.

2. The vehicle as set forth in claim 1, wherein the mounting bracket is fused to the exterior surface at a welded joint.

3. The vehicle as set forth in claim 1, wherein the mounting bracket is fused to the exterior surface at a plurality of welded joints, at least some of the welded joints being spaced from each other cross-vehicle and vehicle-longitudinally.

4. The vehicle as set forth in claim 3, wherein the vehicle includes a longitudinal centerline and the vehicle body includes a vehicle roof including the exterior surface, the vehicle roof including a left longitudinal roof rail and a right longitudinal roof rail on opposite sides of the longitudinal centerline, a first one of the welded joints being between the longitudinal centerline and the right longitudinal roof rail and a second one of the welded joints being between the longitudinal centerline and the left longitudinal roof rail.

5. The vehicle as set forth in claim 4, wherein:
the first one of the welded joints is closer to the right longitudinal roof rail than the vehicle centerline; and
the second one of the welded joints being closer to the left longitudinal roof rail than the vehicle centerline.

6. The vehicle as set forth in claim 3, wherein the welded joints are between the hole and an outer periphery of the mounting bracket.

7. The vehicle as set forth in claim 3, wherein the seal extends endlessly around all of the plurality of welded joints.

8. The vehicle as set forth in claim 1, further comprising a second seal between the vehicle body and the sensor housing, the second seal extending endlessly around the seal.

9. The vehicle as set forth in claim 1, wherein:
the mounting bracket includes a bottom surface abutting the exterior surface of the vehicle body and an upturned flange extending upwardly from the bottom surface away from the exterior surface at an outer periphery of the bottom surface; and
the seal is fixed to the upturned flange and extends from the upturned flange to the exterior surface of the vehicle body.

10. The vehicle as set forth in claim 1, wherein the sensor assembly includes an object-detection sensor.

11. The vehicle as set forth in claim 1, wherein the sensor assembly includes an image sensor.

12. The vehicle as set forth in claim 1, further comprising a passenger compartment, the vehicle body including a vehicle roof having the exterior surface and an interior surface opposite the exterior surface, the interior surface facing the passenger compartment.

13. The vehicle as set forth in claim 1, wherein the vehicle body includes a vehicle roof including the exterior surface and the mounting bracket structurally reinforces the vehicle roof.

14. The vehicle as set forth in claim 1, wherein the sensor housing has a base and a cap, the base being releasably connected directly to the mounting bracket and the cap being releasably connected directly to the base.

15. A sensor assembly comprising:
a mounting bracket having a bottom surface and an upturned flange extending upwardly from the bottom surface at an outer periphery of the bottom surface, the upturned flange defining a seal channel;
the mounting bracket including a plurality of threaded holes;
a sensor housing having a plurality of through-holes positioned to be aligned with the threaded holes;
the sensor housing having a bottom lip positioned to extend endlessly around the mounting bracket when the through-holes are aligned with the threaded holes; and
a seal fixed to the bottom lip extending along the bottom lip endlessly around the mounting bracket.

16. The vehicle as set forth in claim 15, wherein the sensor housing has a base and a cap, the base being releasably connected directly to the mounting bracket and the cap being releasably connected directly to the base.

17. A vehicle comprising:
a vehicle body having an exterior surface;
a sensor assembly having a mounting bracket and a sensor housing;
the mounting bracket being on the exterior surface of the vehicle body and fused to the exterior surface of the vehicle body;
the sensor housing being releasably connected to the mounting bracket;
the mounting bracket being fused to the exterior surface at a plurality of welded joints, at least some of the welded joints being spaced from each other cross-vehicle and vehicle-longitudinally; and a seal fixed to the mounting bracket and the exterior surface of the vehicle body and extending from the mounting bracket to the exterior surface of the vehicle body, the seal extending endlessly around all of the plurality of welded joints.

18. The vehicle as set forth in claim 17, wherein:
the mounting bracket includes a bottom surface abutting the exterior surface of the vehicle body and an upturned flange extending upwardly from the bottom surface away from the exterior surface at an outer periphery of the bottom surface; and
the seal is fixed to the upturned flange and extends from the upturned flange to the exterior surface of the vehicle body.

19. The vehicle as set forth in claim 17, wherein the sensor assembly includes an object-detection sensor.

20. The vehicle as set forth in claim 17, wherein the vehicle body includes a vehicle roof including the exterior surface and the mounting bracket structurally reinforces the vehicle roof.

* * * * *